(12) United States Patent
Siemer et al.

(10) Patent No.: US 7,870,975 B2
(45) Date of Patent: Jan. 18, 2011

(54) WATER-DISPENSING APPLIANCE AND DRINKS-DISPENSING ARRANGEMENT WITH A WATER-DISPENSING APPLIANCE

(75) Inventors: Andreas Siemer, Allmersbach (DE); Norbert Maier, Weissach (DE)

(73) Assignee: Alfred Kaercher GmbH & Co. KG, Winnenden (DE)

( * ) Notice: Subject to any disclaimer, the term of this patent is extended or adjusted under 35 U.S.C. 154(b) by 0 days.

(21) Appl. No.: 12/456,695

(22) Filed: Jun. 19, 2009

(65) Prior Publication Data

US 2009/0321335 A1     Dec. 31, 2009

Related U.S. Application Data

(63) Continuation of application No. PCT/EP2007/009821, filed on Nov. 14, 2007.

(30) Foreign Application Priority Data

Dec. 22, 2006  (DE) .................. 10 2006 062 352

(51) Int. Cl.
*B67D 7/74* (2010.01)
*B67D 7/76* (2010.01)
*B67D 7/80* (2010.01)
*B01D 35/18* (2006.01)

(52) U.S. Cl. ............... 222/129.1; 222/146.1; 222/190; 222/318; 210/175

(58) Field of Classification Search ............... 392/441, 392/465, 471; 422/1
See application file for complete search history.

(56) References Cited

U.S. PATENT DOCUMENTS

| | | | |
|---|---|---|---|
| 1,354,582 A | 10/1920 | Shimp | |
| 1,745,189 A | 1/1930 | Porter | |
| 1,832,723 A | 11/1931 | Mueller | |
| 2,289,632 A | 7/1942 | Dalzell et al. | |
| 3,416,569 A | 12/1968 | Barrera | |

(Continued)

FOREIGN PATENT DOCUMENTS

DE            2029 488            4/1971

(Continued)

OTHER PUBLICATIONS

Machine Translation of EP 1637504 (A1), Schramm et al., Mar. 22, 2006.*

*Primary Examiner*—Duane Smith
*Assistant Examiner*—Paul J. Durand
(74) *Attorney, Agent, or Firm*—Lipsitz & McAllister, LLC

(57) ABSTRACT

A water-dispensing appliance is provided, in particular for dispensing drinking water, comprising a water inlet which can be connected to a water-supply device, also comprising a dispensing device with a water outlet, via which water can be dispensed from the appliance, the dispensing device being connected to the water inlet via a main line which has a downstream portion and an upstream portion, and also comprising a water heater. The water-dispensing appliance has a return line, of which the start is line-connected to the downstream portion of the main line and the end is connected to the upstream portion of the main line, and the appliance also has a delivery unit in order for water heated up by means of the water heater to be delivered through the main line from the upstream portion to the downstream portion.

25 Claims, 5 Drawing Sheets

U.S. PATENT DOCUMENTS

| | | | |
|---|---|---|---|
| 3,625,402 A | 12/1971 | Kulis | |
| 4,267,947 A | 5/1981 | Wasserstrom | |
| 5,157,797 A | 10/1992 | Forwick | |
| 5,386,849 A | 2/1995 | Gilchrist et al. | |
| 5,956,965 A * | 9/1999 | Watanabe et al. | 62/389 |
| 6,478,200 B1 | 11/2002 | Davis | |
| 6,772,919 B2 | 8/2004 | Magri | |
| 6,824,116 B1 | 11/2004 | Woo et al. | |
| 7,121,287 B2 * | 10/2006 | Carhuff et al. | 134/169 R |
| 2001/0023881 A1 | 9/2001 | Magri | |
| 2003/0127145 A1 | 7/2003 | Carris et al. | |
| 2003/0230597 A1* | 12/2003 | Naik | 222/129.1 |
| 2004/0056046 A1* | 3/2004 | Jones et al. | 222/129.3 |
| 2007/0175063 A1* | 8/2007 | Morgan et al. | 34/467 |
| 2008/0256972 A1* | 10/2008 | Knoll et al. | 62/376 |

FOREIGN PATENT DOCUMENTS

| | | |
|---|---|---|
| DE | 35 12 880 | 1/1987 |
| DE | 297 08 900 | 8/1997 |
| DE | 298 16 611 | 5/1999 |
| DE | 199 22 084 | 11/2000 |
| DE | 100 58 534 | 9/2001 |
| DE | 201 18 359 | 4/2002 |
| DE | 601 02 252 | 2/2005 |
| DE | 10 2005 014 478 | 10/2005 |
| DE | 10 2004 045 059 | 3/2006 |
| DE | 20 2006 003 226 | 5/2006 |
| EP | 0 983 961 | 3/2000 |
| EP | 1 637 504 | 3/2006 |
| FR | 634 957 | 3/1928 |
| GB | 2 357 751 | 7/2001 |
| WO | 01/19734 | 3/2001 |
| WO | WO 2005/068349 A1 * | 7/2005 |

* cited by examiner

WATER-DISPENSING APPLIANCE AND DRINKS-DISPENSING ARRANGEMENT WITH A WATER-DISPENSING APPLIANCE

This application is a continuation of international application No. PCT/EP2007/009821 filed on Nov. 14, 2007.

The present disclosure relates to the subject matter disclosed in international application number PCT/EP2007/009821 of Nov. 14, 2007 and German application number 10 2006 062 352.5 of Dec. 22, 2006, which are incorporated herein by reference in their entirety and for all purposes.

BACKGROUND OF THE INVENTION

The invention relates to a water-dispensing appliance, in particular for dispensing drinking water, comprising a water inlet which is adapted to be connected to a water-supply device, also comprising a dispensing device with a water outlet, via which water can be dispensed from the appliance, the dispensing device being connected to the water inlet via a main line which has a downstream portion and an upstream portion, and also comprising a water heater.

The invention also relates to a drinks-dispensing arrangement with a water-dispensing appliance.

Water-dispensing appliances of the type in question are usually connected to the public water-supply network, but may also be connected to some other water-supply means, for example a pump. They are often in the form of so-called water dispensers, which can dispense drinking water and are set up, for example, in public buildings, hotels, stores or hospitals, etc. As an alternative, water-dispensing appliances of the type in question may be designed as so-called under-counter or under-sink appliances which can dispense water via sink fittings. Common to all variants is the problem of dispensing water to a consumer in as germ-free a manner as possible. On the one hand, the bacterial content of the water which is to be dispensed is predetermined by the quality of the water provided by the water-supply device. In addition, there is a risk of contamination of water stored in the appliance.

In order to dispense sufficiently germ-free water, DE 35 12 880 C1 proposes a water-dispensing appliance of the type in question in which the water supplied from the water-supply device is heated to approximately 95° C. for at least 3 minutes by a water boiler incorporated in the main line before the water is dispensed from the appliance. The heating operation kills off bacteria contained in the water. In order to avoid contamination of the water in the main line when the water-dispensing appliance is inactive, a thermal sterilizing operation is provided in which that region of the main line which is disposed downstream of the water boiler is flushed with the hot water. The heat transferred from the hot water to the main line likewise sterilizes the latter. The hot water is then discarded, so that the sterilizing operation involves high energy and high water consumption. Moreover, the sterilizing operation covers only those portions of the main line which are located downstream of the water boiler.

It is an object of the present invention to provide a water-dispensing appliance of the type in question which can be used to carry out a thermal sterilizing operation with relatively low energy consumption.

SUMMARY OF THE INVENTION

This object is achieved according to the invention, in the case of a water-dispensing appliance of the type mentioned in the introduction, in that the water-dispensing appliance has a return line, the start of which is line-connected to the downstream portion of the main line and the end of which is line-connected to the upstream portion of the main line, and the appliance also has a delivery unit in order for water heated up by means of the water heater to be delivered through the main line from the upstream portion to the downstream portion.

The water-dispensing appliance according to the invention comprises a water heater by means of which water which is present in the appliance can be heated up, in particular to a temperature at which bacteria present in the water are killed off. The water-dispensing appliance also comprises a delivery unit by means of which the heated water can be delivered through the main line. The start of a return line is line-connected to the main line at a downstream portion of the main line, i.e. a portion of the main line which is closer to the dispensing device than to the water inlet. "Line-connected" here covers the possibilities where the start of the return line is connected to the main line both indirectly, i.e. via an intermediate line, and directly, for example by branching off or direct connection. The end of the return line is line-connected to an upstream portion of the main line, i.e. a portion of the main line which is closer to the water inlet than to the dispensing device. This gives rise to a flow circuit through which the heated water can be advanced by means of the delivery unit. For the purpose of regulating and controlling the flow, the water-dispensing appliance may have suitable valves. By virtue of the water being a thermal transfer medium, the lines within the flow circuit are also sterilized, in particular the main line between the portions which are line-connected to the start and the end of the return line. The sterilizing operation requires only a low level of energy because the water used for sterilizing the lines does not have to be discarded, as is the case with the appliance described in the abovementioned document DE 35 12 880 C1; instead, it remains in the flow circuit. It is thus possible for the water stored in the appliance to be reused, following the sterilizing operation, for dispensing as intended.

It is advantageous if the main line has a feed portion, which connects the water heater to the water inlet, and a dispensing portion, which connects the water heater to the dispensing device, and if the start of the return line is line-connected to the dispensing portion and the end of the return line is line-connected to the feed portion. In this embodiment, the water heater is incorporated in the main line. The water heater can thus be used both for dispensing hot water during normal operation and for heating up the water for a thermal sterilizing operation. Furthermore, this makes it possible for the feed portion to be thermally sterilized between its region which is line-connected to the end of the return line and the water heater.

The end of the return line is preferably connected to the feed portion immediately downstream of the water inlet. This allows the feed portion to be thermally sterilized over its entire length.

The start of the return line is advantageously connected to the dispensing portion immediately upstream of the dispensing device. This makes it possible for the dispensing portion to be sterilized over its entire length. In combination with the embodiment described above, the main line can thus be sterilized over its entire length with a low level of energy.

It is advantageous if the delivery unit is configured as a pump incorporated in the return line. The pump can be used to deliver the water through the return line and through the main line.

As an alternative, it may also be provided for the delivery unit to be configured as a pump incorporated in the main line upstream of the water heater. This has the advantage that the thermal loading of the pump can be kept to a comparatively low level.

It is advantageous if the water heater is designed to heat up water at least to a temperature which is necessary for pasteurizing the water in the water-dispensing appliance. "Pasteurizing" here is understood to mean the killing off of bacteria present in the water. This takes place by the water being heated to a certain temperature for a minimum duration, it being possible for the duration to be shorter as the temperature increases. For example, provision may be made for the water in the water-dispensing appliance to be heated up to 90° C. and to be delivered through the flow circuit for a few minutes by means of the pump in order to ensure a sufficiently good sterilizing result. In another embodiment of the water-dispensing appliance, this is achieved in a manner which is advantageous in respect of energy by the water being heated up to 65° C. by means of the water heater and being delivered through the flow circuit for 15 minutes.

The water heater is preferably in the form of a flow heater. As a result, the water is only heated up in accordance with requirements. Accordingly, the energy which is necessary for heating up the water can be minimized. The flow heater may be operated, for example, electrically. It is also possible for the flow heater to be operated by gas.

The water-dispensing appliance advantageously comprises a store for heated water. This is advantageous in particular when the water-dispensing appliance is designed for dispensing hot water. The store makes it possible for hot water to be supplied promptly to a user requiring it and thus for the user's waiting time to be kept short. The store is advantageously integrated in the water heater, so that heated water can be channeled directly into the store. The store preferably has a capacity of approximately 0.2 l. The amount of energy required by the appliance in standby operation can be thus kept to a low level.

It is advantageous if the dispensing device has a first connection, connected to the dispensing portion, and a second connection, in flow connection with the first connection, the first and second connections each being in flow connection with the water outlet, and also has a valve device, by which the flow connection between the first connection and the water outlet and between the second connection and the water outlet can be broken. This makes it possible for the dispensing device to be flushed with hot water between the first and the second connections and to be thermally sterilized in this way. By means of the valve device, the flow connection from the first connection, and from the second connection, to the water outlet can be broken, so that the sterilizing operation can be carried out without water having to be dispensed from the water-dispensing appliance.

It is advantageous here if the water-channeling components of the dispensing device are produced from a thermally conductive material which is thermally stable at a temperature necessary for pasteurizing the water in the water-dispensing appliance. The water flowing through the water-dispensing device between the first and the second connections can deliver its heat to the dispensing device and heat up the same. The thermal conductivity of the material causes the heat to propagate as far as the water outlet. This makes it possible also for those portions of the dispensing device which have not been flushed with water to be heated up to the temperature which is necessary for pasteurizing the water and thus also for the dispensing device to be thermally sterilized between the valve device and the water outlet.

It is advantageous if the start of the return line is connected to the second connection. In this way, the start of the return line is line-connected to the dispensing portion via the dispensing device. The dispensing device is incorporated in the flow circuit formed from the main line and return line and hot water can be fed from the water heater, via the dispensing portion, to the dispensing device for thermal sterilizing purposes.

The water-dispensing appliance preferably has a bypass line which connects the feed portion to the dispensing device. The bypass line can be used to feed water directly from the feed portion to the dispensing device, the water heater being bypassed. This water, which is not heated during normal operation of the water-dispensing appliance, can be dispensed directly, for example, from the appliance. However, it is also possible for the water from the bypass line and the water heated up by the water heater to be mixed in the dispensing device in order to achieve the desired water temperature at the water outlet.

The bypass line is advantageously connected to the second connection of the dispensing device. In this case, the start of the return line preferably branches off from the dispensing portion of the main line immediately upstream of the first connection of the dispensing device. The dispensing device can then be thermally sterilized by heated water being delivered from the second connection to the first connection of the dispensing device through the return line, the feed portion and the bypass line. This defines a second flow circuit of the water-dispensing appliance.

It is advantageous if the water-dispensing appliance has a filter device incorporated in the feed portion. The filter device can be used to filter out foreign bodies and particles present in the water. The filter device is advantageously exchangeable.

The filter device preferably has a filter medium with a filtration grade <0.2 μm. This makes it possible to restrain bacteria and viruses. The filter medium used may be, for example, an ultrafiltration membrane. The filter device can be used to filter out even particularly small foreign bodies and, in addition, a large number of bacteria and microorganisms from the water. This increases the quality of the water dispensed from the appliance.

The filter device is advantageously disposed downstream of the location where the end of the return line is connected to the feed portion, and the water-channeling components of the filter device are produced from materials which are thermally stable at a temperature necessary for pasteurizing the water in the water-dispensing appliance. The arrangement of the filter device makes it possible for it likewise to be flushed with hot water. If the water temperature is above the temperature which is necessary for pasteurizing purposes, the filter device can be thermally sterilized in this way. It then defines a bacteria barrier at the entrance to the appliance. During normal operation, the filter device can be used to filter bacteria out of the water, and the bacteria can be killed off during a thermal sterilizing operation.

It is advantageous if the water-dispensing appliance comprises a control device which is adapted to trigger a thermal sterilizing operation of the water-dispensing appliance. A thermal sterilizing operation may be carried out, for example, as follows: end the water-dispensing operation by closing the valve device on the dispensing device, heat up water by means of the water heater to a temperature which is necessary for pasteurizing purposes, for example 65° C., start the delivery unit in order to deliver heated water through the flow circuits of the water-dispensing appliance for a certain period of time, for example 15 minutes, switch off the delivery unit and resume normal operation.

The thermal sterilizing operation can advantageously be triggered automatically and/or manually. It may thus be provided that the control device triggers a sterilizing operation automatically, for example following predetermined inactive periods of the water-dispensing appliance. This ensures that the bacterial content of the water stored in the appliance does not rise above a certain level. It may also be provided that the control device triggers a sterilizing operation automatically once a predetermined quantity of water has been dispensed from the appliance. In addition, it is possible for a user to trigger a thermal sterilizing operation by activating the control device, for example if he or she has reservations regarding the current bacterial content of the water in the appliance.

It is advantageous if the thermal sterilizing operation can be triggered at predeterminable time intervals since it is thus possible to ensure, in a technically straightforward manner, that the bacterial content of the water in the appliance does not rise to inadmissible values.

In order to ensure that the temperature which is necessary for pasteurizing the water in the appliance is reached during a thermal sterilizing operation, the water-dispensing appliance advantageously has one or more temperature sensors which are coupled to the control device and which are adapted to be used to measure the water temperature. Such temperature sensors may be disposed, for example, in each line which is to be flushed, but also on the water heater, the filter device, etc.

The water-dispensing appliance preferably has a water-cooling device. This makes it possible for the water-dispensing appliance to dispense cooled water as well.

The water-cooling device is advantageously incorporated in a cold-water line, the start of which is line-connected to the feed portion and the end of which is line-connected to the dispensing device. In this way, the water-cooling device is associated with a dedicated line, so that cold water can be supplied by the appliance in accordance with requirements. Since the cold-water line is line-connected to the feed portion and the dispensing device, this gives rise to a third flow circuit, which can also be included in the thermal sterilizing operation. The cold-water line and the water-channeling components of the water-cooling device can be thermally sterilized in this way.

The water-cooling device is preferably in the form of a compressor unit. This constitutes a technically particularly straightforward configuration. As an alternative, the water-cooling device could be operated, for example, by means of a Peltier element.

It is advantageous if the water-dispensing appliance has a gas-mixing chamber which is incorporated in a water-channeling line of the water-dispensing appliance. This allows water which is to be dispensed from the water-dispensing appliance to be enriched with a gas, for example carbon dioxide ($CO_2$). The water-dispensing appliance may have, for example, a pressurized gas vessel, which is preferably connected in an exchangeable manner to the gas-mixing chamber, so that the gas which is to be mixed with the water can be introduced into the gas-mixing chamber, as required, from the pressurized gas vessel.

It is advantageous if the gas-mixing chamber is incorporated in the cooling-water line downstream of the water-cooling device. Since the solubility of gases in water increases as the temperature drops, the water cooled by means of the water-cooling device can be enriched with $CO_2$ (carbonated) to particularly good effect.

In a preferred embodiment of the water-dispensing appliance according to the invention, the water-channeling components of the water-dispensing appliance are provided, at least in part, with a coating which inhibits bacterial growth. This prevents the growth of bacteria which collect on the water-channeling components. Examples of conceivable coatings are those with elemental silver, which have a bactericidal effect.

It is advantageous if the water-dispensing appliance has an automatic cleaning device. For example, it is possible to provide a tablet magazine which contains descaling tablets, and the control device can cause the latter to be dispensed. Such a cleaning operation can be carried out, for example, following a thermal sterilizing operation.

As mentioned in the introduction, the invention also relates to a drinks-dispensing arrangement. A drinks-dispensing arrangement according to the invention comprises a water-dispensing appliance of the type described above and a mixing device which is intended for preparing a drink, the mixture device being adapted to mix water dispensed from the water-dispensing appliance with a powder or extract. The drinks-dispensing arrangement, then, has the above-described advantages of the water-dispensing appliance.

The following description of preferred embodiments serves to explain the invention in more detail in conjunction with the drawings.

DETAILED DESCRIPTION OF THE INVENTION

Figure 1:
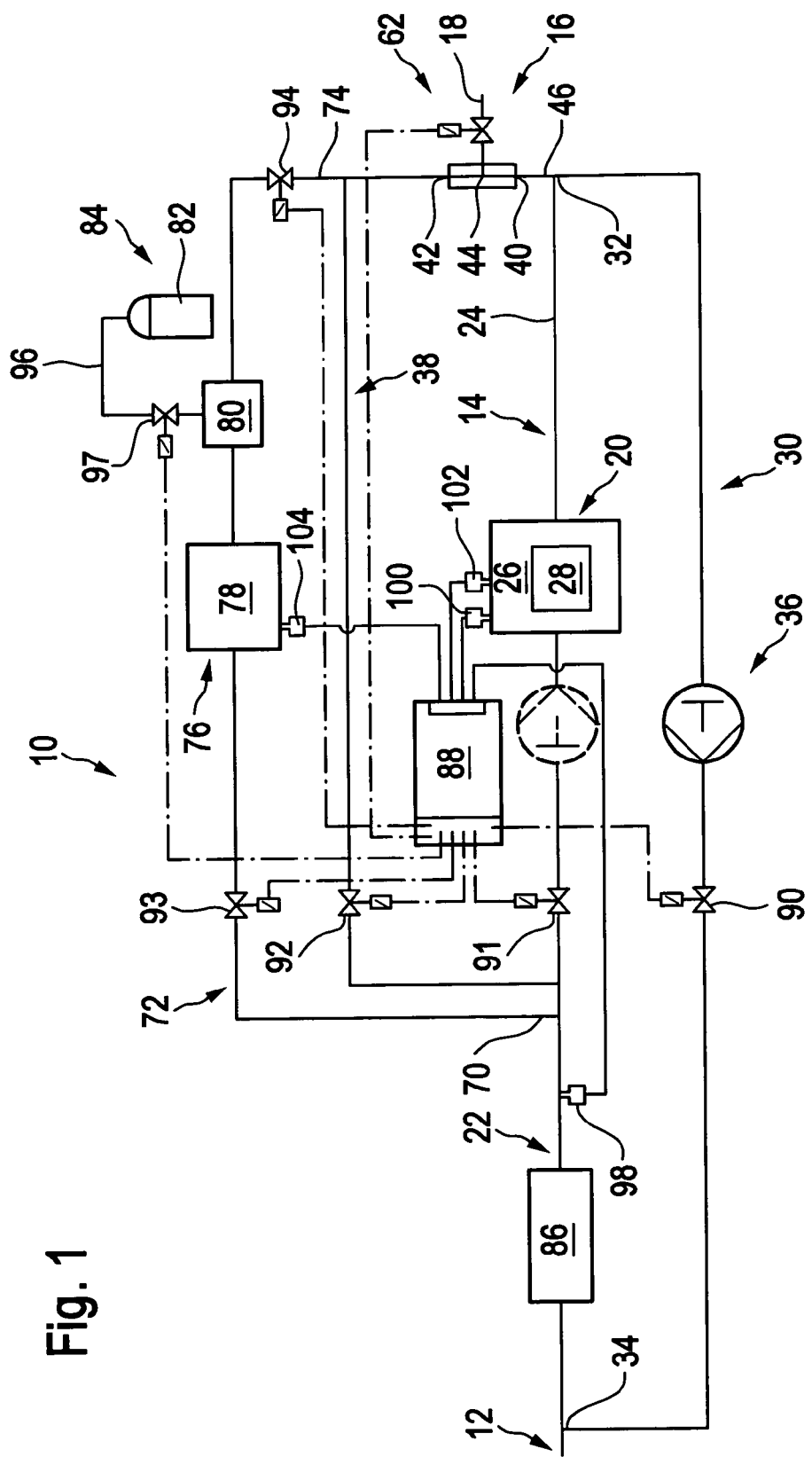
FIG. 1 shows a schematic illustration of a first embodiment of the water-dispensing appliance according to the invention.

A first embodiment of the water-dispensing appliance according to the invention is illustrated schematically in FIG. 1 and designated as a whole there by the reference numeral 10. The water-dispensing appliance 10 is in the form of a so-called water dispenser, which is set up, for example, in public buildings, hospitals or stores, hotels, etc. and is designed for dispensing preferably predetermined quantities of drinking water.

Via a water inlet 12, the water-dispensing appliance 10 can be connected to a water-supply means, preferably the public water-supply network. The water inlet 12 is connected, via a main line 14, to a dispensing device 16 which has a water outlet 18, via which the water which a user requires can be dispensed to him.

The main line 14 has incorporated in it a water heater 20 which is connected to the water inlet 12 via a feed portion 22, which forms an upstream portion of the main line 14. The water heater 20 is connected to the dispensing device 16 via a dispensing portion 24, which forms a downstream portion of the main line 14. The water heater 20 is in the form of a flow heater 26, which is adapted to heat up water flowing through the main line 14, and it comprises a water store 28 for the interim storage of the heated water.

The water-dispensing appliance 10 also comprises a return line 30, of which the start 32 is connected to the dispensing portion 24, such that it branches off therefrom, immediately upstream of the dispensing device 16. A return-line end 34 is connected to the feed portion 22, by branching into the latter, immediately downstream of the water inlet 12. Proceeding from the return-line end 34 via the main line 14, the return-line start 32 and the return line 30, this gives rise to a first flow circuit, in which water can be circulated through the main line 14 and the return line 30 by means of a delivery unit in the form of a pump 36 incorporated in the return line 30.

Figure 2:
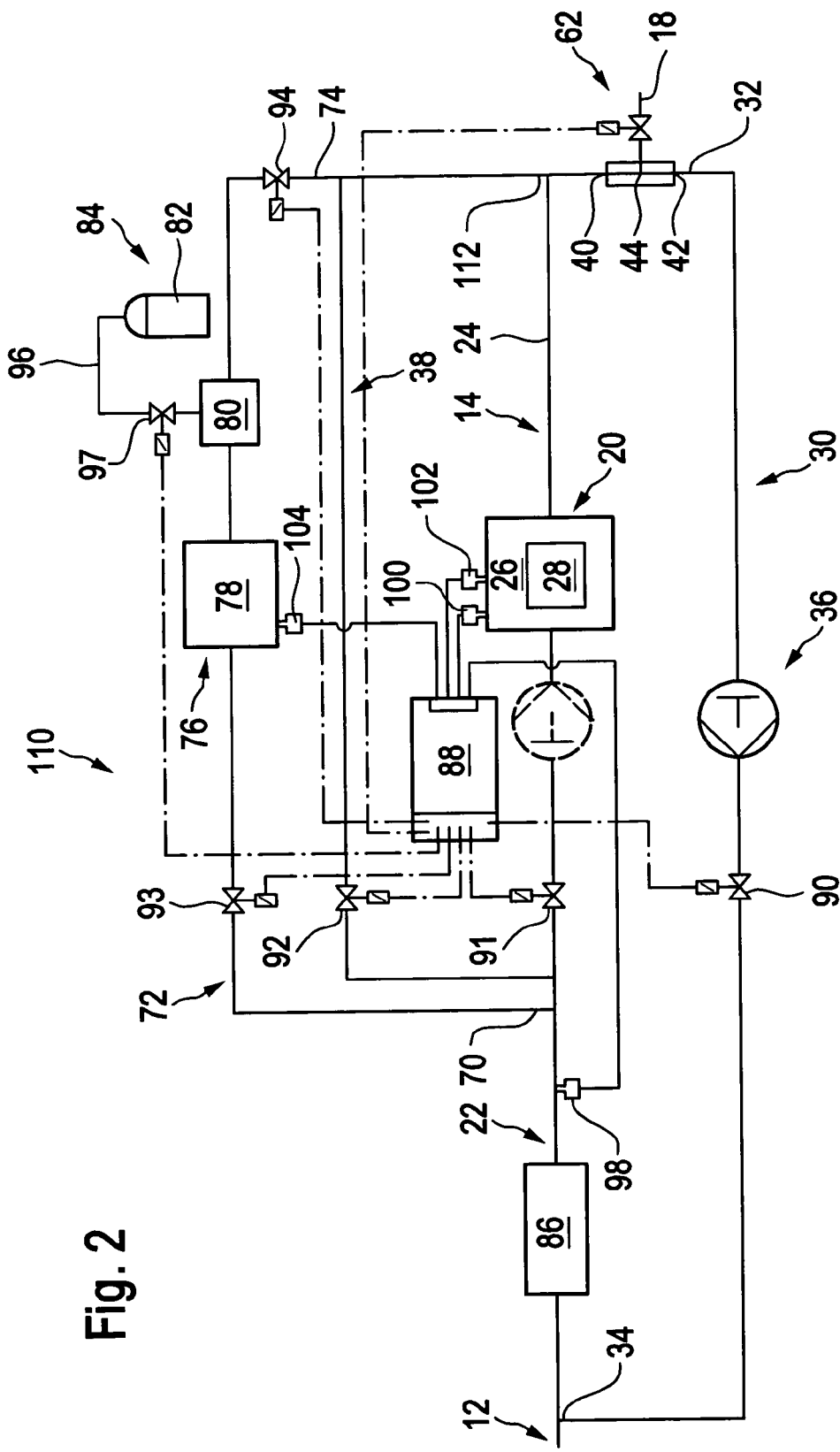
FIG. 2 shows a schematic illustration of a second embodiment of the water-dispensing appliance according to the invention.

Instead of disposing the pump 36 in the return line 30, it may also be provided, as an alternative, that the pump 36 is incorporated in the main line 14 immediately upstream of the water heater 20, as is illustrated by dashed lines in FIGS. 1 and 2. Arranging the pump 36 upstream of the water heater 20 is associated with the pump 36 being subjected to a lower level of thermal loading.

A bypass line 38 branches off from the feed portion 22 downstream of the location where the return-line end 34 is connected, and this bypass line connects the feed portion 22 to the dispensing device 16 by bypassing the water heater 20.

The dispensing device 16 comprises a first connection 40, to which the dispensing portion 24 is connected, and a second connection 42, to which the bypass line 38 is connected. The first connection 40 and the second connection 42 are connected to one another via a channel 44, so that a second flow circuit, through which water can be delivered by means of the pump 36, is formed via the bypass line 38, the channel 44, a line portion 46 of the dispensing portion 24, this line portion being located between the first connection 40 and the return-line start 32, the return line 30 and the feed portion 22.

Figure 3:
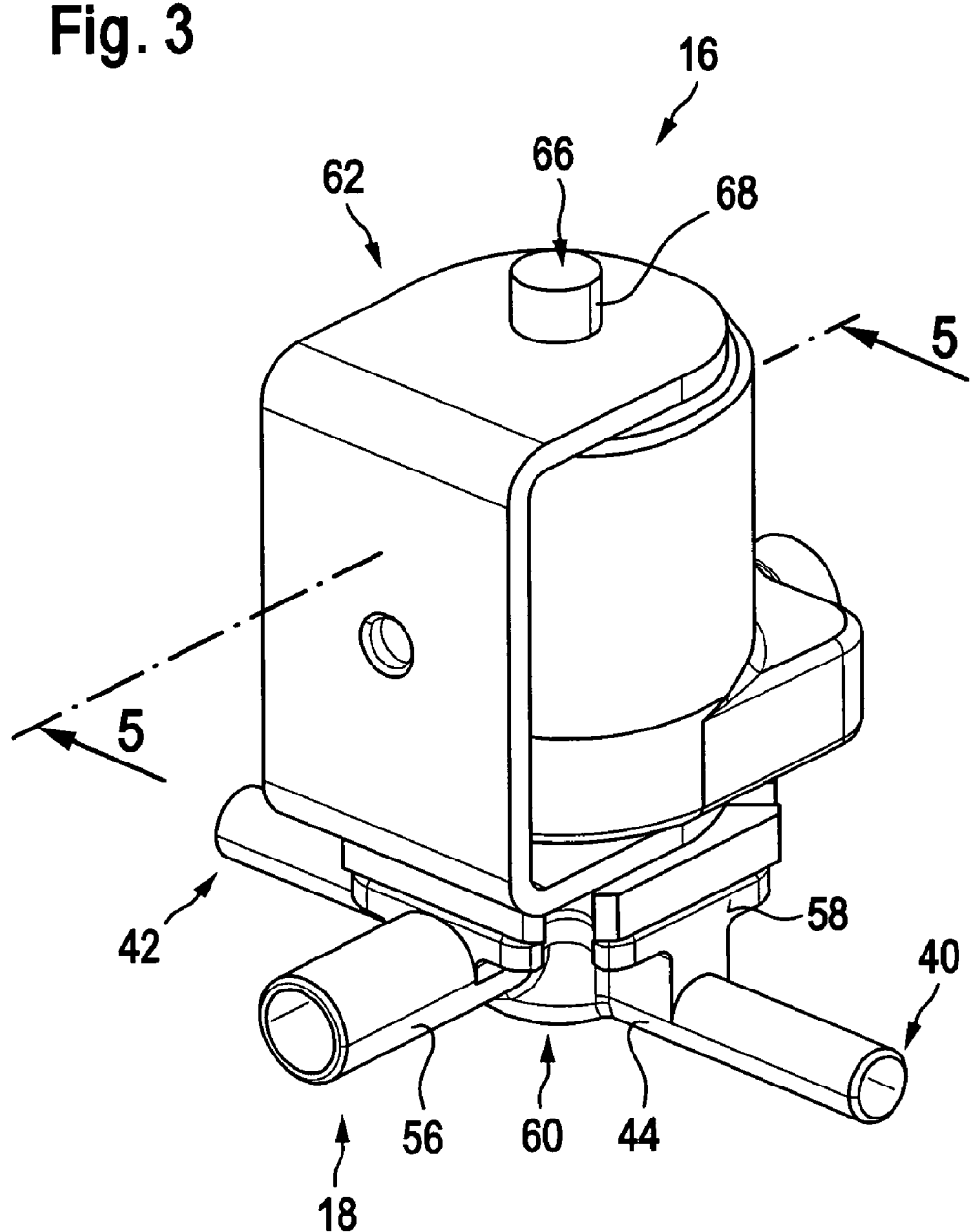
FIG. 3 shows a perspective view of a dispensing device of the water-dispensing appliance.
Figure 4:
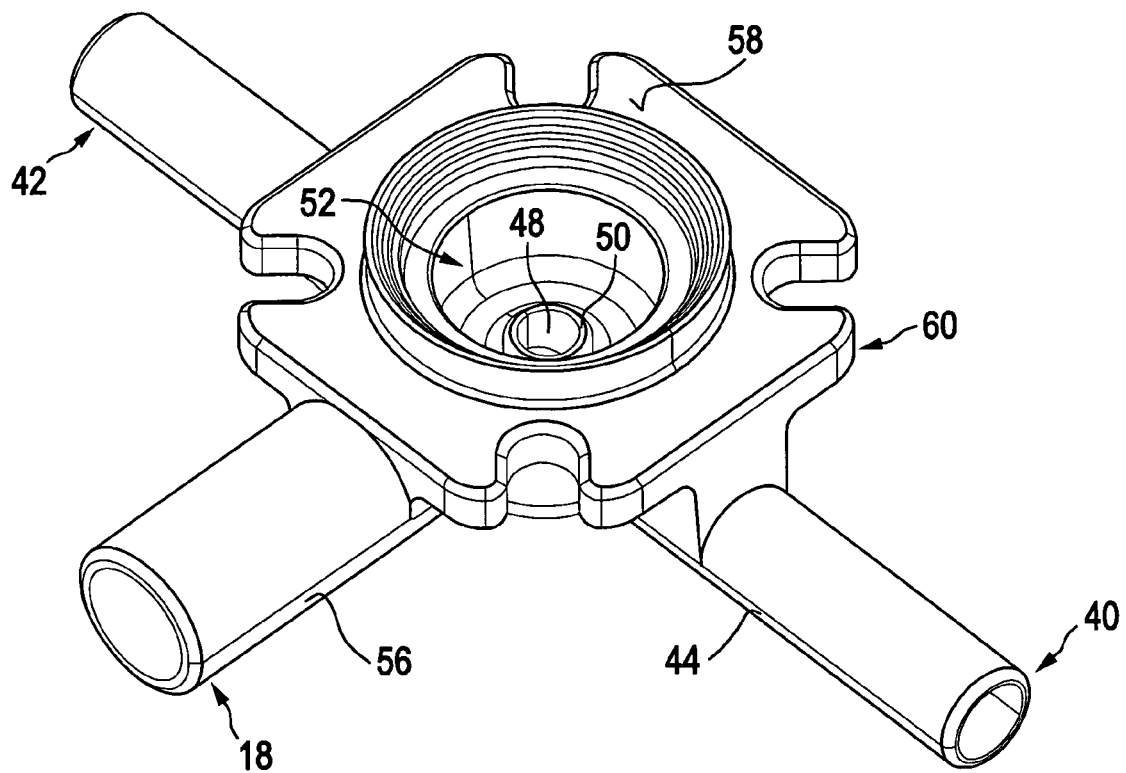
FIG. 4 shows a perspective view of a valve body of the dispensing device from FIG. 3.
Figure 5:
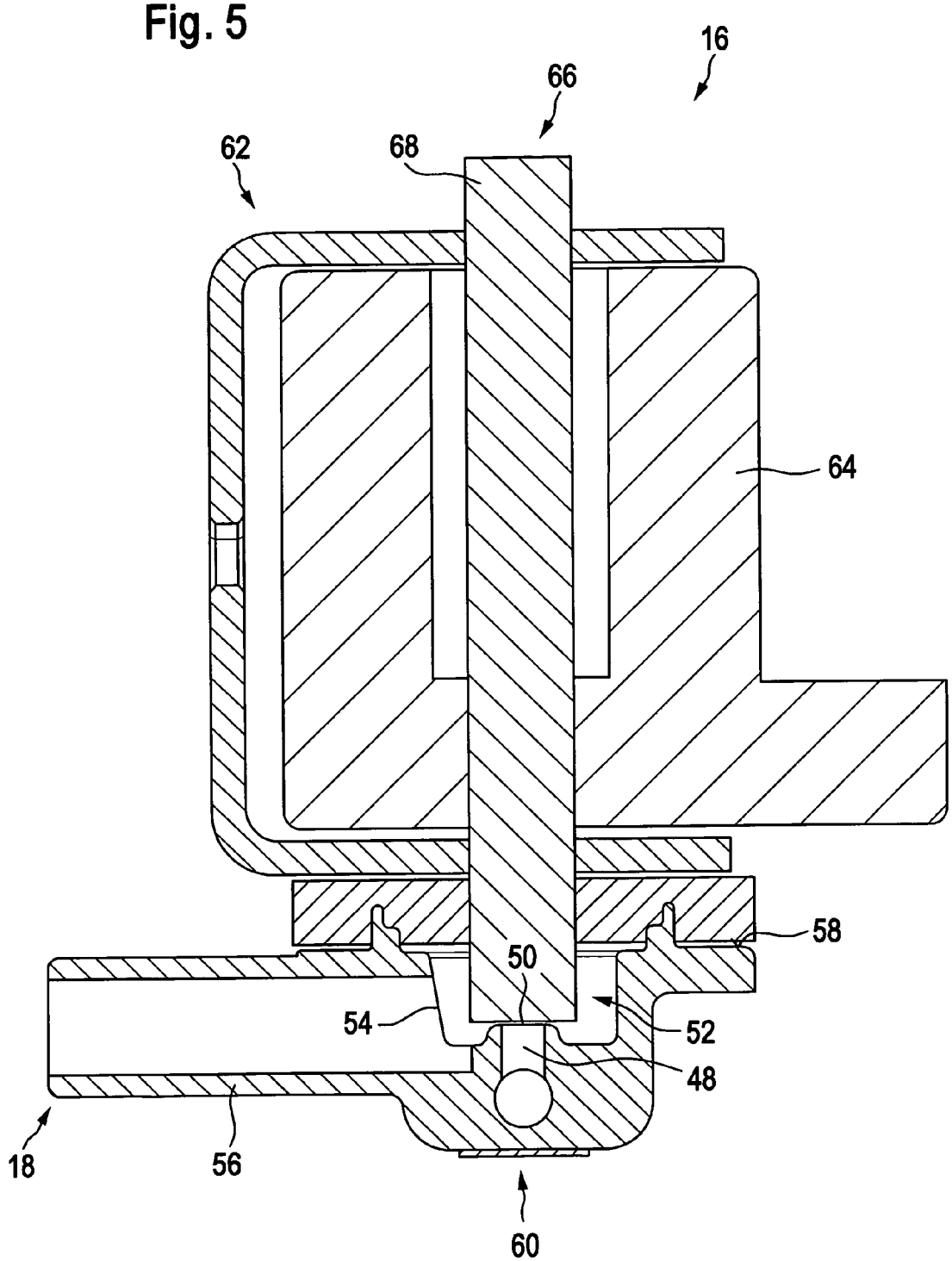
FIG. 5 shows a sectional view of the dispensing device as seen along line 5-5 in FIG. 3.

As is clear from FIGS. 3 to 5, a tubular extension 48 branches off in the radial direction from the cylindrical channel 44 between the first connection 40 and the second connection 42, and the end 50 of the tubular extension, this end being directed away from the channel 44, opens into the interior of a more or less cylindrical cup 52 which is integrally formed on the flow capillary 44. An outlet line 56, at the end of which is disposed the water outlet 18, projects from the cup 52 via a lateral opening 54. The channel 44, the cup 52, the outlet line 56 and an abutting flange 58 that surrounds the cup form a valve housing 60 which is moulded in one piece from aluminum.

The abutting flange 58 has disposed on it an electromagnetically actuable valve drive 62 with a coil 64 in which a magnet armature 66 is mounted in a displaceable manner. The magnet armature 66 forms a valve body 68 which engages in the cup 52 and can engage against the end 50 of the tubular extension 48 in order thus to break a flow connection between the channel 44 and the water outlet 18. The flow connection between the first connection 40 and the second connection 42 via the channel 44 still remains in this case. By means of the coil 64, the dispensing device 16 can be opened, i.e. the valve body 68 can be raised from the end 50 of the extension, and the flow connection between the water outlet 18 and the first connection 40, and between the water outlet 18 and the second connection 42, can thus be reinstated.

Between the locations where the return-line end 34 branches in and the bypass line 38 branches off from the feed portion 22, the start 70 of a cold-water line 72 branches off from this feed portion, the end 74 of the cold-water line branching into the bypass line 38 in the vicinity of the second connection 42. In this way, a third flow circuit, through which water can be circulated by means of the pump 36, is formed via the cold-water line 72, an end portion of the bypass line 38, the channel 44, the line portion 46, the return line 30 and the feed portion 22.

The cold-water line 72 has incorporated in it a water-cooling device 76 in the form of a compressor unit 78, by which water fed via the cold-water line 72 can be cooled. A gas-mixing chamber 80 is incorporated in the cold-water line 72 downstream of the compressor unit 78 and is line-connected to a pressurized gas storage vessel 84 in the form of a gas cylinder 82. The exchangeable gas cylinder 82 contains pressurized $CO_2$, which can be introduced into the gas-mixing chamber 80 in order for water fed through the cold-water line 72 to be enriched with $CO_2$ (carbonated).

Between the locations where the return-line end 34 is connected and the cold-water line 72 branches off from the feed portion 22, the latter has incorporated in it an exchangeable filter device 86, which will be explained in more detail hereinbelow.

The water-dispensing appliance 10 also comprises a control device 88 which is adapted to be actuated by a user and is in electrical connection with valves 90, 91, 92, 93 and 94 incorporated respectively in the return line 30, the feed portion 22, the bypass line 38 and in the cold-water line 72. Furthermore, the control device 88 is in electrical connection with a valve 97, which is disposed in a gas line 96 between the gas cylinder 82 and the gas-mixing chamber 80, and with the valve drive 62 of the dispensing device 16. The control device 88 is also connected electrically to a temperature sensor 98, which is disposed on the feed portion 22 downstream of the filter device 86, to two temperature sensors 100 and 102, which are disposed on the water heater 20, and to a temperature sensor 104, which is disposed on the compressor unit 78. The temperature sensors 98, 100 and 104 respectively serve for measuring the water temperature in the feed portion 22, in the water heater 20 and in the compressor unit 78. The temperature sensor 102 is a safety temperature sensor for preventing the flow heater 26 from overheating.

The water-dispensing appliance 10 according to the invention can be used to carry out a thermal sterilizing operation for the water present in the appliance and for the water-channeling components of the appliance. Sterilization takes place by means of pasteurization, this being understood here as the killing off of bacteria present in the water by virtue of the water being heated up above a certain temperature for a period of time which is correlated with this temperature. In a configuration of the water-dispensing appliance 10 which is illustrated schematically in FIG. 1, it has proven advantageous in terms of energy, for the purpose of achieving a sufficiently good sterilizing result, for the water-channeling components of the water-dispensing appliance 10 to be flushed with hot water at a temperature of 65° C. for 15 minutes. The procedure here may be as follows:

Such a thermal sterilizing operation can be triggered by the control device 88. Provision is made here, on the one hand, for manual triggering, which a user can carry out by actuating the control device 88. On the other hand, however, it is also possible for the control device 88 to trigger a sterilizing operation automatically, for example following predetermined inactive periods of the water-dispensing appliance 10 or once a predetermined quantity of water has been dispensed. It may further be provided that the control device 88 triggers a sterilizing operation automatically at predeterminable, and preferably alterable, time intervals.

The water heater 20 is designed in order for the water fed to it to be heated up to the temperature which is necessary for pasteurization, for example 65° C. By means of the pump 36, the heated water can be pumped to the start of the main line 14 via the return line 30 and can flush the first flow circuit with the main line 14, the second flow circuit with the bypass line 38 and the third flow circuit with the cold-water line 72. In this case the valves 90, 91, 92, 93 and 94 are open and the dispensing device 18 is closed by means of the valve body 68, so that hot water can flow through the dispensing device 60 via the channel 44 without water being dispensed via the water outlet 18.

By means of the temperature sensors 98, 100 and 104, the water temperature can be sensed during the sterilizing operation and monitored by the control device 88.

Following the necessary sterilizing period correlated with the temperature, for example 15 minutes, on the one hand the water pumped through the appliance has been sterilized. On the other hand, those components of the water-dispensing appliance 10 which have been flushed with the hot water have been sterilized: the main line 14, the return line 30, the bypass line 38, the cold-water line 72 and also the water heater 20, the water-cooling device 76 and the gas-mixing chamber 80, but also the dispensing device 60 and the filter device 46.

The filter device 86 has its water-channeling components produced from materials which are thermally stable at a temperature which is necessary for pasteurizing the water, for example 65° C. It comprises, for example, an ultrafiltration membrane by means of which even very small extraneous particles and bacteria can be filtered out of the water. Such thermally stable ultrafiltration membranes are known, for example, from dialysis. The thermally sterilizable filter device 86 thus defines a bacteria barrier at the entrance to the water-dispensing appliance 10.

At the exit from the water-dispensing appliance 10, i.e. at the dispensing device 16, the channel 44 is flushed, during the sterilizing operation, by hot water which can deliver its heat to the metal valve housing 60. In this way, the valve housing 60 is heated up, as far as the water outlet 18, to the temperature which is necessary for pasteurization, and is thermally sterilized. The dispensing device 16 thus defines a bacteria barrier at the exit from the water-dispensing appliance 10.

A thermal sterilizing operation covers all the water-channeling components of the water-dispensing appliance 10 from the water inlet 12 to the water outlet 18. Since the hot water can be pumped in circulation through the flow circuits, the thermal sterilizing operation can be carried out using a low level of energy. Since there is no need for any water to be dispensed via the water outlet 18 during the sterilizing operation, the sterilizing operation can also be carried out without any water consumption.

A second embodiment of the water-dispensing appliance according to the invention is shown in FIG. 2 and designated there by the reference numeral 110. The water-dispensing appliance 10 differs from the water-dispensing appliance 10 in the way in which the dispensing device 16 is connected to the main line 14, the return line 30 and the bypass line 38.

In the water-dispensing appliance 110, the return-line start 32 is connected to the second connection 42 of the dispensing device 16 and, in this way, is line-connected to the dispensing portion 24 of the main line 14. The bypass line 38 is connected to the main line 14 by virtue of its end 112 being branched into the dispensing portion 24 in the vicinity of the first connection 40. The water-dispensing appliance 110 likewise has the features and advantages already described in conjunction with the water-dispensing appliance 10.

The water-channeling components of the water-dispensing appliances 10 and 110 may be provided, at least in part, with a coating which inhibits bacterial growth, for example with a coating which comprises elemental silver, which has a bactericidal effect.

Moreover, the water-dispensing appliances 10 and 110 may comprise an automatic cleaning device, for example in the form of a tablet magazine which can be controlled by the control device 88 and has descaling tablets accommodated in it. A cleaning operation can be triggered, for example, by the control device 88 and carried out following a thermal sterilizing operation.

A drinks-dispensing arrangement according to the invention can be realized by means of the water-dispensing appliances 10 and 110 according to the invention. Such a drinks-dispensing arrangement comprises the water-dispensing appliance 10 or 110 and also a mixing device which is intended for preparing a drink, the mixing device being adapted to mix water dispensed from the water-dispensing appliance 10 or 110 with a powder or extract. The drinks-dispensing arrangement has the advantages already mentioned in the description of the water-dispensing appliance.

The invention claimed is:

1. Water-dispensing appliance, in particular for dispensing drinking water, comprising:
    a water inlet adapted to be connected to a water-supply device,
    a dispensing device with a water outlet, via which water can be dispensed from the appliance, the dispensing device being connected to the water inlet via a main line which has a downstream portion and an upstream portion,
    a water heater,
    a return line,
    a delivery unit for delivering water heated up by the water heater through the main line from the upstream portion to the downstream portion,
    the main line having a feed portion forming the upstream portion of the main line, which connects the water heater to the water inlet, and a dispensing portion forming the downstream portion of the main line, which connects the water heater to the dispensing device, a start of the return line being line-connected to the dispensing portion and an end of the return line being line-connected to the feed portion, and
    a filter device incorporated in the feed portion, the filter device being disposed downstream of a location where the end of the return line is connected to the feed portion,
    wherein water-channelling components of the filter device are produced from materials which are thermally stable at a temperature necessary for pasteurizing the water in the water-dispensing appliance.

2. Water-dispensing appliance according to claim 1, wherein the end of the return line is connected to the feed portion immediately downstream of the water inlet.

3. Water-dispensing appliance according to claim 1, wherein the start of the return line is connected to the dispensing portion immediately upstream of the dispensing device.

4. Water-dispensing appliance according to claim 1, wherein the delivery unit is configured as a pump incorporated in the return line.

5. Water-dispensing appliance according to claim 1, wherein the delivery unit is configured as a pump incorporated in the main line upstream of the water heater.

6. Water-dispensing appliance according to claim 1, wherein the water heater is designed to heat up water at least to a temperature which is necessary for pasteurizing the water in the water-dispensing appliance.

7. Water-dispensing appliance according to claim 1, wherein the water heater is in the form of a flow heater.

8. Water-dispensing appliance according to claim 1, further comprising a store for heated water.

9. Water-dispensing appliance according to claim 1, wherein the dispensing device has a first connection, connected to the dispensing portion, and a second connection, in flow connection with the first connection, the first and second connections each being in flow connection with the water outlet, and also has a valve device, by which the flow connection between the first connection and the water outlet and between the second connection and the water outlet can be broken.

10. Water-dispensing appliance according to claim 9, wherein the water-channelling components of the dispensing device are produced from a thermally conductive material which is thermally stable at a temperature necessary for pasteurizing the water in the water-dispensing appliance.

11. Water-dispensing appliance according to claim 9, wherein the start of the return line is connected to the second connection.

12. Water-dispensing appliance according to claim 9, wherein a bypass line connects the feed portion to the second connection of the dispensing device.

13. Water-dispensing appliance according to claim 1, further comprising a bypass line which connects the feed portion to the dispensing device.

14. Water-dispensing appliance according to claim 1, further comprising a control device adapted to trigger a thermal sterilizing operation of the water-dispensing appliance.

15. Water-dispensing appliance according to claim 14, wherein the thermal sterilizing operation can be triggered automatically and/or manually.

16. Water-dispensing appliance according to claim 14, wherein the thermal sterilizing operation can be triggered at predeterminable time intervals.

17. Water-dispensing appliance according to claim 14, further comprising one or more temperature sensors which are coupled to the control device and are adapted to measure water temperature.

18. Water-dispensing appliance according to claim 1, further comprising a water-cooling device.

19. Water-dispensing appliance according to claim 18, wherein the water-cooling device is incorporated in a cold-water line, a start of the cold-water line being line-connected to the feed portion and an end of the cold-water line being line-connected to the dispensing device.

20. Water-dispensing appliance according to claim 18, wherein the water-cooling device is in the form of a compressor unit.

21. Water-dispensing appliance according to claim 1, further comprising a gas-mixing chamber which is incorporated in a water-channelling line of the water-dispensing appliance.

22. Water-dispensing appliance according to claim 21, wherein the gas-mixing chamber is incorporated in a cold-water line downstream of the water-cooling device.

23. Water-dispensing appliance according to claim 1, wherein the water-channelling components of the water-dispensing appliance are provided, at least in part, with a coating which inhibits bacterial growth.

24. Water-dispensing appliance according to claim 1, further comprising an automatic cleaning device.

25. Drinks-dispensing arrangement, comprising:
   a water-dispensing appliance comprising:
      a water inlet adapted to be connected to a water-supply device,
      a dispensing device with a water outlet, via which water can be dispensed from the appliance, the dispensing device being connected to the water inlet via a main line which has a downstream portion and an upstream portion,
      a water heater,
      a return line,
      a delivery unit for delivering water heated up by the water heater through the main line from the upstream portion to the downstream portion,
      the main line having a feed portion forming the upstream portion of the main line, which connects the water heater to the water inlet, and a dispensing portion forming the downstream portion of the main line, which connects the water heater to the dispensing device, a start of the return line being line-connected to the dispensing portion and an end of the return line being line-connected to the feed portion, and
      a filter device incorporated in the feed portion, the filter device being disposed downstream of a location where the end of the return line is connected to the feed portion,
      wherein water-channelling components of the filter device are produced from materials which are thermally stable at a temperature necessary for pasteurizing the water in the water-dispensing appliance, and
   a mixing device for preparing a drink, the mixing device being adapted to mix water dispensed from the water-dispensing appliance with a powder or extract.

* * * * *